United States Patent [19]

O'Kane

[11] Patent Number: 5,614,145

[45] Date of Patent: Mar. 25, 1997

[54] METHOD AND APPARATUS FOR FORMING AN ARTICLE OF PET MATERIAL

[75] Inventor: Pearse O'Kane, Aysgarth, Ireland

[73] Assignee: Polysheet (Ireland) Limited, Dublin, Ireland

[21] Appl. No.: 232,335

[22] Filed: Apr. 22, 1994

Related U.S. Application Data

[63] Continuation of Ser. No. 988,353, Dec. 7, 1992, abandoned, which is a continuation of Ser. No. 743,631, Aug. 12, 1991, abandoned.

[30] Foreign Application Priority Data

Aug. 12, 1990 [IE] Ireland ........................... 484/90

[51] Int. Cl.$^6$ ................ B29C 51/10; B29C 51/42
[52] U.S. Cl. ............ 264/458; 264/346; 264/553; 264/901
[58] Field of Search ................ 264/522, 553, 264/554, 458, 901, 346, 235; 425/384, 388

[56] References Cited

U.S. PATENT DOCUMENTS

| | | | |
|---|---|---|---|
| 3,496,143 | 2/1970 | Siggel | 264/553 |
| 4,110,395 | 8/1978 | Akutin et al. | 264/210.5 |
| 4,127,631 | 11/1978 | Dempsey et al. | 264/553 |
| 4,165,357 | 8/1979 | Vetter | 264/548 |
| 4,469,270 | 9/1984 | Gartland | 264/553 |
| 4,582,665 | 4/1986 | Jabarin | 264/522 |
| 4,663,094 | 5/1987 | Buck et al. | 264/553 |
| 4,666,394 | 5/1987 | Wakamiya et al. | 425/384 |
| 4,778,372 | 10/1988 | Mutti et al. | 425/388 |
| 4,878,826 | 11/1989 | Wendt | 264/550 |
| 4,927,591 | 5/1990 | Nilsson | 425/387.1 |
| 4,943,406 | 7/1990 | Bocchi | 264/549 |
| 4,960,556 | 10/1990 | Oehlenschlaeger | 264/322 |

FOREIGN PATENT DOCUMENTS

| | | |
|---|---|---|
| 55-73516 | 6/1980 | Japan ............... 264/901 |
| 59-5019 | 1/1984 | Japan ............... 264/901 |
| 2001577 | 2/1979 | United Kingdom . |
| 2059328 | 4/1981 | United Kingdom . |

*Primary Examiner*—Catherine Timm
*Attorney, Agent, or Firm*—Sughrue, Mion, Zinn Macpeak & Seas

[57] ABSTRACT

A method and apparatus for forming an article from a sheet of PET material of thickness greater than 1 mm comprises heating the PET sheet to a preforming temperature of approximately 110° C. by heaters, and then forming the sheet onto a heated vacuum mold. The sheet is retained in the mold by the vacuum and the surface of the sheet are maintained at a temperature of approximately 160° C. by the mold and the heater, respectively, until the degree of crystallization of the sheet is in the order of 35%.

11 Claims, 2 Drawing Sheets

METHOD AND APPARATUS FOR FORMING AN ARTICLE OF PET MATERIAL

This is a Continuation of application Ser. No. 07/988,353 filed Dec. 7, 1992, now abandoned, which is a continuation of application Ser. No. 07/743,631 filed Aug. 12, 1991 now abandoned.

FIELD OF THE INVENTION

The present invention relates to a method and apparatus for forming an article from a sheet of polyethylene terephthalate material, hereinafter referred to as a PET sheet, and further the invention relates to an article formed according to the method. In particular, the invention relates to a method and apparatus for forming an article from a PET sheet such that the formed article is dimensionally stable at temperatures in excess of 70° C., and preferably, dimensionally stable up to temperatures in excess of 200° C.

BACKGROUND TO THE INVENTION

Amorphous PET material, in other words, PET material which has a relatively low degree of crystallisation, becomes dimensionally unstable at relatively low temperatures. In general, an article of amorphous PET material becomes dimensionally unstable at approximately 70° C., and for safety, it is recommended that such articles should not be subjected to temperatures in excess of 50° C. It is known that by increasing the degree of crystallisation of the PET of the article, the temperature at which the PET becomes dimensionally unstable is increased. By increasing the degree of crystallisation of the PET material of an article above 25%, the article remains dimensionally stable at temperatures in excess of 200° C. Increasing the degree of crystallisation of the PET material of the article further increases the temperature at which the article remains stable.

It is known to thermo-form an article from a sheet of PET material, and in the thermo-forming of the article, provide the article with a degree of crystallisation which increases the temperature at which the article remains dimensionally stable. For example, U.S. Pat. No. 3,496,143 describes a method for thermo-forming an article from a sheet of PET material using a vacuum deep drawing apparatus. The PET sheet is of 3 mm thickness, and of area 370 mm by 280 mm. The method requires that the PET sheet should have an initial degree of crystallisation lying in the range of 5% to 25%. The method requires the PET sheet to be subjected to heat treating prior to forming in the vacuum mould of the apparatus. On being formed, the sheet, while still in the mould, is subjected to further heat treatment by heat transfer from the mould. Heat is transferred into the formed sheet through the surface of the sheet in contact with the mould. The formed sheet is retained in the mould until the degree of crystallisation of the formed sheet is greater than 25%. It is suggested in the specification that the article formed is dimensionally stable at a temperature of 160° C. for sixty minutes. In other words, the moulded article was heated and maintained at a temperature of 160° C. for sixty minutes and it proved to be fully dimensionally stable during the sixty minute period.

It has been found that, in general, the method proposed in U.S. Pat. No. 3,496,143 is unsuitable for thermo-forming a dimensionally stable article from PET sheet material of thickness greater than 1 mm. In particular, it has been found that articles produced using the method proposed in the U.S. specification become dimensionally unstable at temperatures in excess of 80° C. Furthermore, the time taken to increase the degree of crystallisation of the PET sheet above 25% using the method proposed in the U.S. specification is uneconomically long.

There is therefore a need for a method and apparatus for forming an article from a PET sheet which is dimensionally stable at temperatures in excess of 70° C., and in particular, there is a need for a method and apparatus for forming an article from a sheet of PET material of thickness greater than 1 mm.

OBJECTS OF THE INVENTION

The present invention is directed towards providing such a method and apparatus and also providing an article formed according to the method.

A particular object of the invention is to provide a method for thermo-forming an article from a sheet of PET material, and in particular, an extruded sheet of PET material. It is an object of the invention that the method for forming the article should be relatively efficient, and the time taken to form the article should be relatively low. The formed article should be dimensionally stable at temperatures in excess of 70° C., and preferably, in excess of 160° C. The method should be suitable for forming an article from a PET sheet of thickness of 1 mm or greater, and preferably, a sheet of PET material of thickness in the range of 1 mm to 10 mm.

It is also an object of the invention that the apparatus should be a relatively efficient apparatus and should enable the method of the invention to be carried out efficiently.

SUMMARY AND ADVANTAGES OF THE INVENTION

According to the invention, there is provided a method for forming an article from a sheet of PET material defining a pair of opposite first and second surfaces, the method comprising the steps of heating the PET sheet so that the first and second surfaces of the PET sheet are at a preforming temperature in the range between the glass/rubber transition temperature and the melt temperature of the PET sheet, forming the heated PET sheet onto a heated mould with the first surface of the PET sheet in contact with the mould, retaining the formed sheet in the mould, maintaining the temperature of the first surface at a crystallising temperature in the range of the glass/rubber transition temperature and the melt temperature of the PET sheet by heat transfer from the mould while the formed sheet is retained in the mould, maintaining the temperature of the second surface at a crystallising temperature substantially similar to the temperature of the first surface while the formed sheet is retained in the mould by heat transfer from a first heat source other than the mould, releasing the formed PET sheet from the mould on the degree of crystallisation of the PET sheet reaching 25% or greater.

The term substantially similar when used to describe the relationship between the crystallising temperatures of the first and second surfaces of the formed sheet means that the crystallising temperatures of the first and second surfaces should be maintained as close as is practically possible to each other. It will be appreciated by those skilled in the art that, in practice, it would be virtually impossible to maintain the first and second surfaces at identical crystallising temperatures, however, the crystallising temperature of the second surface should be maintained within + or −5° C. of the crystallising temperature of the first surface. Accordingly, the term substantially similar as used throughout this specification and the claims when referring to the crystallising temperatures of the first and second surfaces is intended to provide for a relatively small variation of + or −5° C. between the two crystallising temperatures.

The advantages of the invention are many. It has been found that the method according to the invention is suitable for thermo-forming articles from relatively thick sheets of PET material which are dimensionally stable up to relatively high temperatures. The temperature level at which an article of PET material remains dimensionally stable is dependent on the degree of crystallisation of the PET material. It has been found that by using the method of the invention, the degree of crystallisation is more uniformly distributed throughout the article than by use of methods known heretofore. This, it has been found, is particularly advantageous in articles produced from relatively thick sheets of PET materials. It is believed that by heating the second surface, in other words, the surface of the PET sheet opposite the surface which is in contact with the mould to a crystallising temperature substantially similar to the crystallising temperature of the first surface while the formed sheet is retained in the mould, provides a much more uniform distribution of heat over the surfaces of the formed sheet, and in turn through the formed sheet and accordingly, provides a much more uniform distribution of crystallisation throughout the formed article. Furthermore, because of the more uniform distribution of heat over the formed sheet, the time taken for the sheet to reach the desired degree of crystallisation is considerably less than the time required to reach a similar degree of crystallisation using methods known heretofore, and also a more dimensionally stable article is achieved. Indeed, the method provides for a much more uniform distribution of crystallisation throughout the article than has been possible to achieve using methods known heretofore, particularly in the formation of articles from relatively thick sheets of PET material, such as, for example, sheets of thickness greater than 1 mm.

In one embodiment of the invention, the first heat source is provided on the side of the PET sheet of the second surface while the formed PET sheet is retained in the mould.

The advantage of providing the first heat source on the side of the PET sheet of the second surface is that it provides for a relatively uniform distribution of heat over the second surface, and also facilitates in maintaining the temperature of the second surface of the PET sheet at a substantially similar temperature to that of the first surface while the formed PET sheet is retained in the mould.

Preferably, the first heat source is provided adjacent the second surface of the PET sheet while the formed PET sheet is retained in the mould. This further facilitates in the provision of a relatively uniform distribution of heat over the second surface of the formed sheet, and leads to a reduction in the time required to reach a desired degree of crystallisation.

In one embodiment of the invention, the crystallising temperature at which the first and second surfaces are maintained while the formed PET sheet is retained in the mould is higher than the preforming temperature. It has been found that by providing a crystallisation temperature higher than the preforming temperature, crystallisation of the formed sheet is more efficiently achieved. In one embodiment of the invention, the temperature difference between the crystallising temperature and the preforming temperature is in the range of 20° C. to 80° C. In general, it has been found that a more efficient method is provided when the crystallising temperature is higher than the preforming temperature.

In another embodiment of the invention, the crystallising temperature at which the first and second surfaces of the PET sheet are maintained while the formed PET sheet is retained in the mould is in the range of 80° C. to 250° C.

The glass/rubber temperature and the melt temperature of most PET materials fall within the range of 80° C. and 250° C. However, in certain cases, where the PET sheet material has a glass transition temperature which falls outside this range, the crystallising temperature may likewise fall outside the range. However, it is preferable that the crystallising temperature is in the range of 120° C. to 210° C. This provides a more efficient method, and in general, the optimum efficiency is achieved where the crystallising temperature is in the range of 140° C. to 180° C. and preferably, approximately 160° C. The rate of crystallisation of PET material is at a maximum in the temperature range of 140° C. to 180° C., and the rate of crystallisation peaks at a temperature of 160° C. Therefore, by maintaining the crystallising temperature in the range of 140° C. to 180° C., and as near to 160° C. as possible, the time taken to reach a desired degree of crystallisation is minimised. The time taken to reach a desired degree of crystallisation increases as the crystallising temperature is reduced below 140° C. and is increased above 180° C. At crystallising temperatures below 120° C. and above 210° C., in general, the time taken to achieve a desired degree of crystallisation becomes uneconomically long.

In one embodiment of the invention, the formed PET sheet is released from the mould on the degree of crystallisation of the formed PET sheet being in the range of 25% to 50%.

At a degree of crystallisation of 25%, most articles of most types of PET material are dimensionally stable up to 160° C. At 50% crystallisation, articles, in general, are dimensionally stable at temperatures in excess of 240° C. In practice, a degree of crystallisation of over 30% is desirable, and preferably, the degree of crystallisation should be over 35%. At a degree of crystallisation of 30%, an article, in general, is dimensionally stable at temperatures in excess 180° C. while at 35% crystallisation, the article is dimensionally stable at temperatures in excess of 200° C.

As mentioned above, the degree of crystallisation of the formed PET sheet is dependent on the temperature to which the surfaces of the formed sheet, and in turn the formed sheet, is heated while in the mould, and also the time period during which the formed sheet is heated while retained in the mould. The degree of crystallisation achieved in a formed sheet of PET, as well as being dependent on the crystallising temperature and the time to which the sheet is subjected to the crystallising temperature, is also dependent on the type of PET material. Some PET materials are slow to crystallise, while others may be relatively rapidly crystallised. In practice, the PET sheet material should be of the type which crystallises at an average to relatively rapid rate, and preferably, for an efficient method, the crystallising temperature should be set subject to the criterion discussed above so that the formed article does not have to be retained in the mould for a time period in excess of five minutes, and preferably, a time period in excess of two minutes. Advantageously, an efficient process subject to the criterion of temperature and material discussed above is achieved when the article is subjected to the crystallising temperature, and is retained in the mould for a time period of thirty seconds to one minute in order to receive the desired degree of crystallisation.

In one embodiment of the invention, the preforming temperature is in the range of 80° C. to 140° C. Preferably, the preforming temperature is in the range of 100° C. to 120° C., and advantageously, the preforming temperature is approximately 110° C. It has been found by maintaining the preforming temperature within the range of 100° C. to 120° C. provides a relatively efficient method.

In another embodiment of the invention, the first heat source comprises a radiant heater directed at the second surface of the PET sheet. The advantage of providing a radiant heater is that it provides a relatively uniform distribution of heat over the second surface of the formed sheet without damage to the surface.

Advantageously, the first and second surfaces of the PET sheet are heated to the preforming temperature by a pair of spaced apart heat sources directed to opposite surfaces of the PET sheet. This provides a relatively efficient method.

In one embodiment of the invention, the heat sources for heating the first and second surfaces of the PET sheet to the preforming temperature comprise respective radiant heaters. Advantageously, one of the radiant heat sources for heating the PET sheet to the preforming temperature is the first heat source.

In one embodiment of the invention, the method includes the step of removing at least the second heat source on the temperature of the PET sheet reaching the preforming temperature, and bringing the mould into engagement with the first surface of the PET sheet.

In another embodiment of the invention, the heated mould is a vacuum mould and the method further comprises the step of applying a vacuum to the mould for forming the PET sheet onto the mould.

Advantageously, the method includes the step of supporting the PET sheet during heating of the first and second surfaces to the preforming temperature.

In one embodiment of the invention, the PET sheet is of thickness greater than 1 mm. The method is particularly suitable for PET sheets of thickness greater than 1.5 mm, and particularly good results are achieved with PET sheets of thickness up to 10 mm, and preferably, sheets of 6 mm thickness.

In general, it is desirable that the intrinsic viscosity of the PET sheet should be in the range of 0.5 to 1.2, and preferably, in the range of 0.8 to 1.0. Advantageously, the intrinsic viscosity of the PET sheet should be approximately 0.85.

The method has been found to be particularly advantageous for forming an article from an extruded sheet of PET material.

Additionally, the invention provides apparatus for forming an article from a sheet of PET material defining a pair of opposite first and second surfaces, the apparatus comprising a mould for engaging the first surface of the PET sheet for forming the PET sheet, means for heating the mould, a first heat source spaced apart from the mould for heating the second surface of the PET sheet while the formed PET sheet is in the mould, support means for supporting the PET sheet between the mould and the first heat source.

The advantages of the apparatus according to the invention are many. In particular, the apparatus enables the method according to the invention to be carried out relatively efficiently. The apparatus according to the invention is also relatively efficient, and can be provided at relatively low cost.

In one embodiment of the invention, a second heat source spaced apart from the first heat source and directed towards the first heat source is provided for heating the first surface of the PET sheet to a preforming temperature prior to forming, and means for moving the second heat source from a heating position adjacent the support means to a remote position remote of the support means is provided for permitting the mould to be brought into engagement with the first surface of the PET sheet. In another embodiment of the invention, the mould is a vacuum mould and vacuum means are provided for applying a vacuum to the mould.

In a further embodiment of the invention, the support means is mounted above the mould.

Preferably, a means for moving the first heat source from the heating position to the remote position is provided. Advantageously, each heat source comprises a radiant heater, and preferably, a plurality of radiant heaters, which, advantageously, are independently controllable.

Further, the invention provides apparatus for forming an article from a sheet of PET material defining a pair of opposite first and second surfaces, the apparatus comprising a mould for engaging the first surface of the PET sheet for forming the PET sheet, means for heating the mould, a pair of spaced apart first and second heat sources directed towards each other for heating the second and first surfaces, respectively, of the PET sheet, support means for supporting the sheet of PET material between the first and second heat sources, means for moving at least the second heat source from a heating position adjacent the support means to a remote position remote of the support means for permitting the mould to be brought into engagement with the first side of the PET sheet.

The invention also provides an article formed from a sheet of PET material according to the method of the invention.

Furthermore, the invention provides an article formed according to the method of the invention and using the apparatus according to the invention.

The invention and the objects and advantages of the invention will be readily apparent to those skilled in the art from the following description of some preferred embodiments thereof which are given by way of non-limiting example with reference to the accompanying drawings.

DETAILED DESCRIPTION OF THE INVENTION

Figure 1:
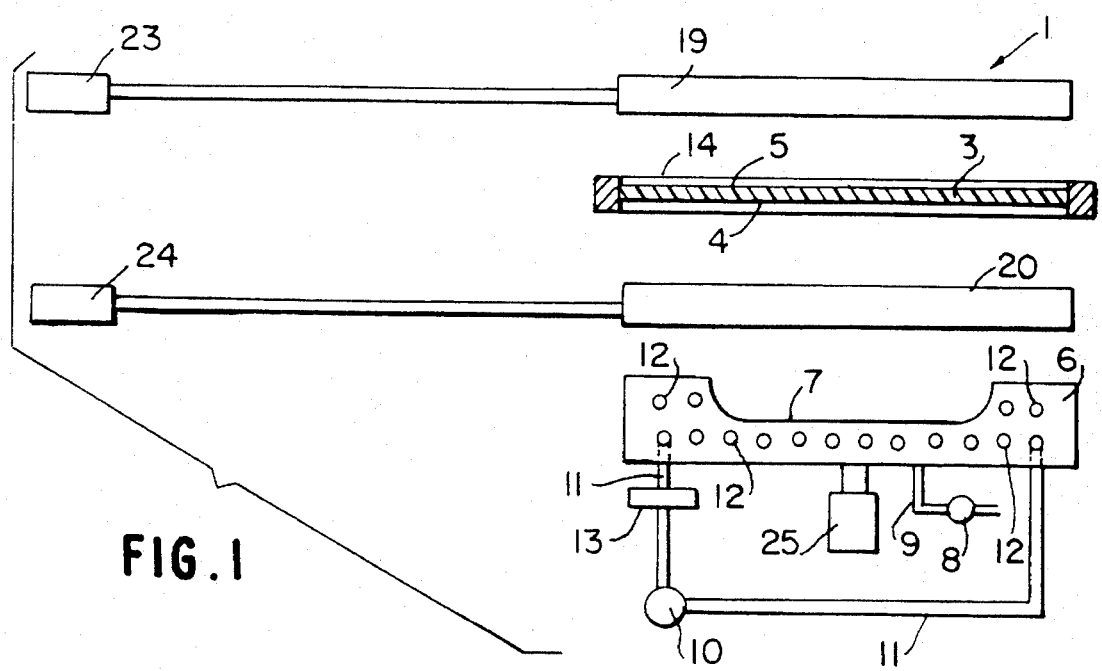
FIGS. 1 to 5 are schematic cross sectional views of apparatus according to the invention in different positions for forming an article from a sheet of PET material using a method according to the invention.
Figure 2:
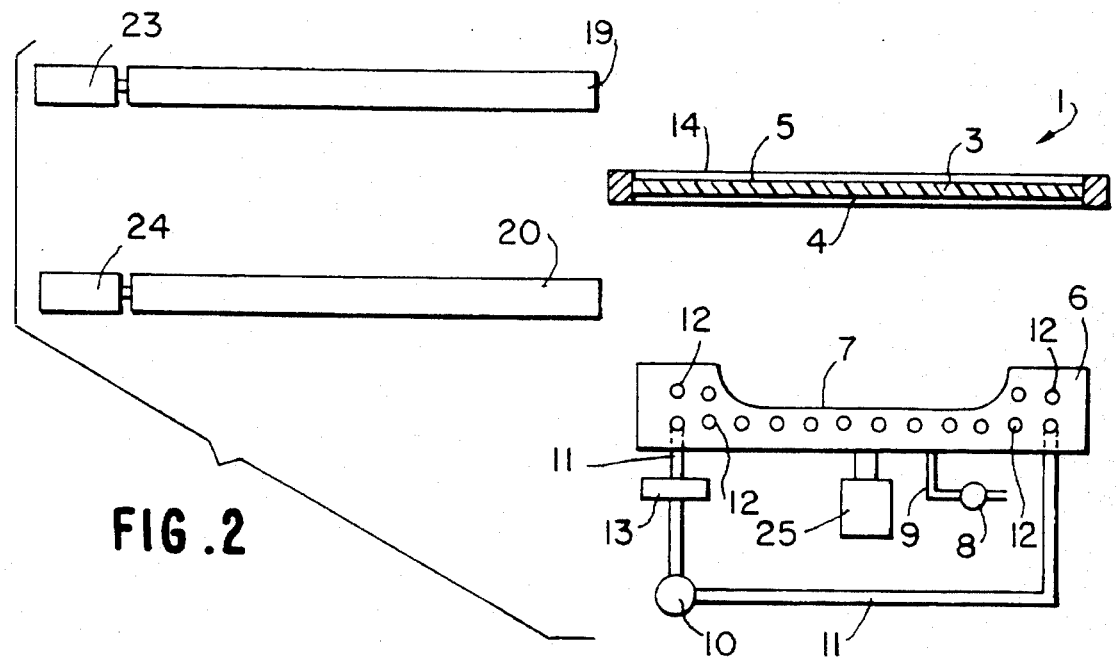

For convenience, the apparatus according to the invention will first be described and a method according to the invention for forming an article from a sheet of PET material using the apparatus will then be described in the examples set out below.

Referring to the drawings, there is illustrated diagrammatically apparatus according to the invention indicated generally by the reference numeral 1 for thermo-forming an article indicated generally by the reference numeral 2 from a sheet 3 of PET material which defines a first surface 4 and a second surface 5. The apparatus 1 comprises a mould 6, in this case, a vacuum mould defining a forming surface 7 onto which the sheet 3 is drawn for forming the article 2. A plurality of holes (not shown) extend through the mould to the forming surface 7 for drawing the sheet 3 onto the forming surface 7. Vacuum means for applying a vacuum to the mould 6 comprises a vacuum pump 8 connected to the mould 6 by a pipeline 9. Heating means comprising heated oil is circulated through interconnected galleries 12 in the mould 6 for heating the mould 6 and the forming surface 7 for forming the article 2 as will be described below. A pump 10 circulates the heated oil through a pipeline 11 connected to the mould 6. A heater 13 in the pipeline 11 heats the oil prior to being returned to the mould 6. Portions of the pipeline 11 adjacent the mould 6 are flexible to facilitate movement of the mould 6 relative to the pump 10 and the heater 13. Such heating arrangements for moulds will be well known to those skilled in the art.

Support means comprising a support framework 14 mounted above the mould 6 supports the PET sheet 3 prior to the sheet 3 being formed on the mould 6. Such support frameworks for securing sheets of plastics material in such vacuum forming apparatus will be well known to those skilled in the art. The support framework 14 is sized to extend around the periphery of the PET sheet 3, and clamps (not shown) on the support framework 14 secure the periphery of the PET sheet 3 to the framework 14.

A pair of spaced apart first and second heat sources for heating the sheet 3 supported in the support framework 14 to a preforming temperature prior to forming the article on the mould 6 comprises a first electrically powered radiant heater 19 and a second electrically powered radiant heater 20. Each radiant heater 19 and 20 comprises a plurality of radiant heater elements (not shown). The heater elements (not shown) of the first and second radiant heaters 19 and 20 are directed towards each other for directing heat towards the respective second and first surfaces 5 and 4 of the sheet 3. The second radiant heater 20 is provided between the mould 6 and the support framework 14 for heating the first surface 4 of the sheet 3 while the first radiant heater 19 is provided above the support framework 14 and is spaced apart therefrom for heating the second surface 5 of the sheet 3. In other words, the support framework 14 and in turn the sheet 3 is provided between the first and second radiant heaters 19 and 20. The first radiant heater 19 also acts as a heat source other than the mould 6 for heating the second surface 5 of the formed sheet 3 when the formed sheet 3 is formed in the mould 6 as will be described below. In this embodiment of the invention, each radiant heater element of the radiant heaters 19 and 20 has a maximum power output of 2 kilowatts and, in general, are not operated at full power.

Figure 3:
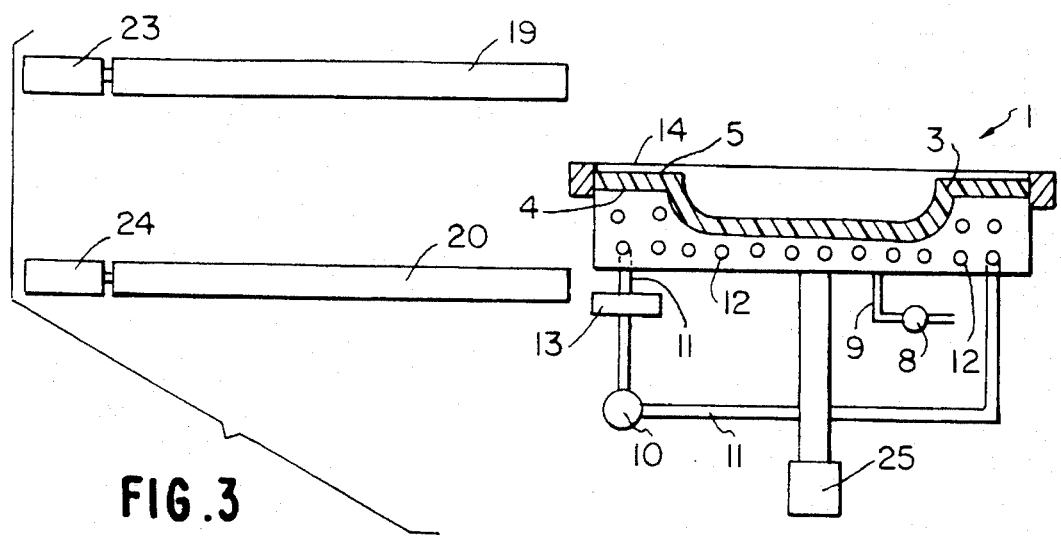

Means for moving at least one of the heaters, in this case, both the first and second heaters 19 and 20 from a heating position illustrated in FIG. 1 with the first and second heaters 19 and 20 adjacent the support framework 14 to a remote position illustrated in FIG. 3 with the heating elements remote of the support framework 14 comprises a hydraulic ram illustrated in block representation and indicated by the reference numerals 23 and 24. The ram 23 moves the first radiant heater 19 between the heating position and the remote position and vice versa, while the ram 24 moves the second radiant heater 20 likewise between the heating position and the remote position. Both rams 23 and 24 may be operated independently of each other. Alternatively, the means for moving the first and second heaters 19 and 20 may comprise electrically powered motors and suitable winches and cables, such arrangements will be well known to those skilled in the art.

Means for moving the mould 6 into engagement with a PET sheet 3 supported in the support framework 14 for forming the sheet 3 comprises an hydraulic ram illustrated in block representation and indicated by the reference numeral 25.

In use, the forming surface 7 of the mould 6 is brought up to the desired temperature, typically, 160° C. With the first and second radiant heaters 19 and 20 in the remote position, a PET sheet 3 to be formed is secured in the support framework 14. The radiant heaters 19 and 20 are moved into the heating position and direct heat to the first and second surfaces 4 and 5 of the sheet 3, thus raising the temperature of the surfaces 4 and 5 to a desired preforming temperature, typically 110° C. On the temperature of the surfaces 4 and 5 of the sheet 3 reaching the preforming temperature, the radiant heaters 19 and 20 are moved into the remote position and the mould 6 with its forming surface 7 at 160° C. is raised into engagement with the heated sheet 3 supported in the framework 14 as illustrated in FIG. 3.

Figure 4:
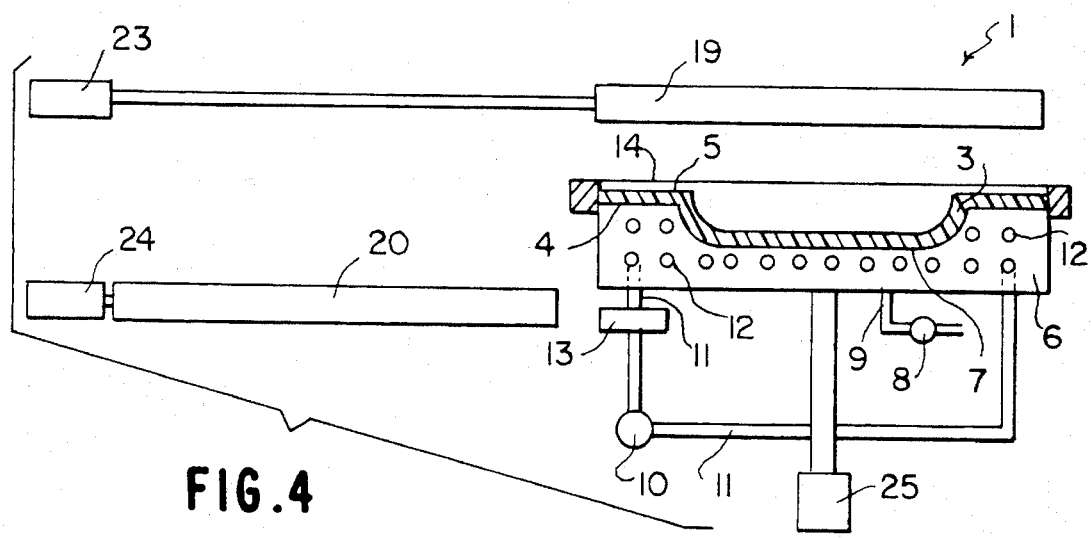
Figure 5:
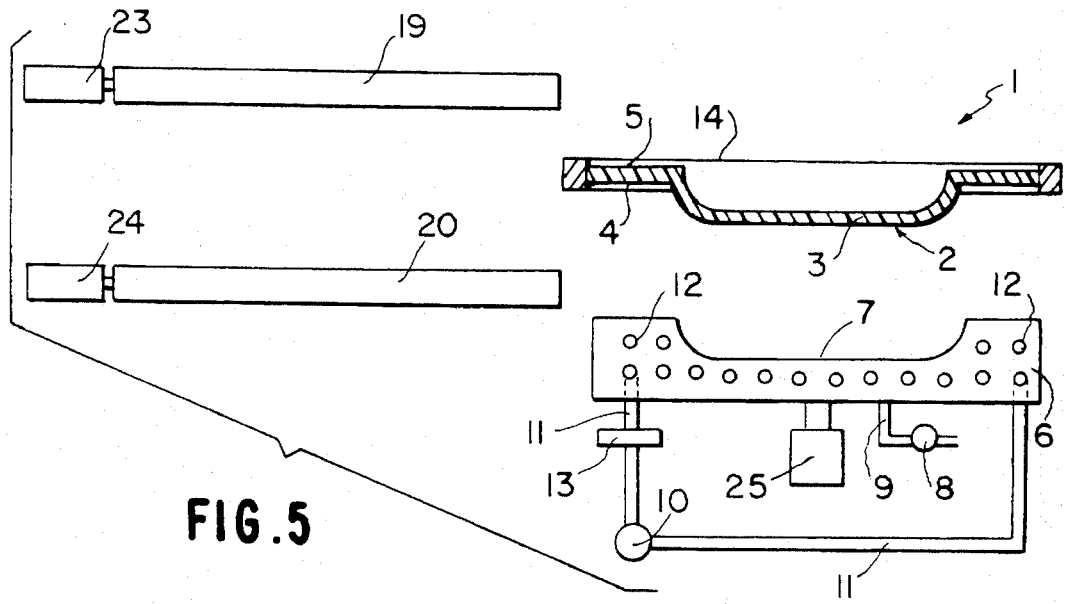

A vacuum from the vacuum pump 8 is applied to the mould 6 to draw the heated sheet 3 onto the forming surface 7 of the mould 6, as illustrated in FIG. 3. The vacuum is held on the mould 6 and immediately on forming the PET sheet, the first radiant heater 19 is moved into the heating position for heating the second surface 5 of the formed sheet 3, see FIG. 4. The first surface 4 of the formed sheet 3 is heated to and maintained at a crystallising temperature of approximately 160° C. by heat transfer from the mould 6 while the formed sheet 3 is retained in the mould for increasing the degree of crystallisation of the formed sheet 3. The first radiant heater 19 heats and maintains the second surface 5 of the formed sheet 3 to a crystallising temperature substantially similar to the crystallising temperature of the first surface 4 while the vacuum is retained, and the formed sheet 3 is retained on the forming surface 7 of the mould 6. On the degree of crystallisation of the formed PET sheet 3 reaching the desired level of crystallisation, generally between 25% and 50%, the vacuum is released from the mould 6 and the first heating element 19 is moved into the remote location. The mould 6 is lowered and the formed article 2 is removed from the support framework 14.

In practice, the heater elements (not shown) of the first radiant heater 19 are controlled independently to vary the temperature profile and in turn the heat output profile from the first radiant heater 19 to accommodate the shape of the formed article 3 in the mould 6. For example, in the case of the article 3 illustrated in the drawings, which is of substantially channel shape, the heat output of the radiant heater elements (not shown) above the dished portion of the article would be adjusted to give a greater heat output than the radiant heater elements (not shown) at each end of the first radiant heater 19 to compensate for the greater distance of the dished portion of the article from the radiant heater elements (not shown) of the first radiant heater 19.

EXAMPLE 1

An extruded sheet 3 of PET material of thickness 3 mm and area 650 mm by 650 mm is formed into an article 2, in this case, a shower tray in the apparatus 1. A suitable mould (not shown) is provided in place of the mould 6. In this example, the article has a finished degree of crystallisation of 35% and has been found to be dimensionally stable at temperatures exceeding 200° C. The PET sheet 3 prior to being formed is an amorphous sheet having virtually no initial crystallisation. The intrinsic viscosity of the PET sheet is 0.8.

The PET sheet 3 is secured in the support framework 14 of the apparatus 1 and heated by the first and second radiant heaters 19 and 20 until the preforming temperature of the first and second surfaces 4 and 5 are at 110° C. In this example, the time taken to raise the temperature of the first and second surfaces 4 and 5 of the sheet to the preforming temperature is approximately thirty-five seconds. On the temperature of the surfaces of the sheet 3 reaching the preforming temperature, the first and second radiant heaters 19 and 20 are moved into the remote position and the mould (not shown) with its forming surface at a temperature of 160° C. is raised into engagement with the heated sheet 3. A vacuum is applied to the mould (not shown) and the sheet 3 is drawn into and formed on the forming surface 7 of the mould. The vacuum is retained on the mould (not shown), thereby retaining the formed sheet 3 on the forming surface 7, and the first radiant heater 19 is moved into the heating position. The mould raises and maintains the first surface of the sheet 3 at a crystallising temperature of approximately 160° C. and the first radiant heater 19 raises and maintains the second surface 5 of the sheet 3 also at a crystallising temperature of approximately 160° C. The vacuum is released from the mould when the degree of crystallisation of the formed sheet has reached 35%. The first radiant heater 19 is moved into the remote location, the mould is lowered and the formed article is removed from the support framework. In this example, the formed sheet 3 was retained in the mould for a time period of one minute to achieve the required degree of crystallisation, namely 35% of the formed article 2.

The dimensional stability of the shower tray was tested by subjecting the shower tray to a conventional shower tray test, which requires alternately filling and emptying the shower tray with hot water at 100° C. and cold water at room temperature for 1,000 cycles. During the test and after the test, the shower tray was found to be fully dimensionally stable.

EXAMPLE 2

In this case, an article, namely, a wash basin, is formed from an extruded sheet of PET material of thickness 3 mm and area of 1,000 mm by 500 mm in the apparatus 1. The PET sheet prior to being formed is an amorphous sheet having virtually no initial crystallisation. The intrinsic viscosity of the PET sheet is 0.8.

The method for forming the wash basin is identical to that described for forming the shower tray of Example 1, with the exception that the preforming temperature to which the first and second surfaces 4 and 5 of the sheet 3 are raised is 115° C. The time taken to reach the preforming temperature in this case is 40 seconds. The forming surface of the mould is at a temperature of 160° C., and accordingly, the first and second surfaces of the formed article are raised and maintained in the mould at a crystallising temperature of 160° C. In this example, a dimensionally stable product up to a temperature of 240° C. is required. The formed article is retained in the mould by the vacuum and the first and second surfaces of the formed article are maintained at the crystallising temperature until the degree of crystallisation of the formed sheet reaches 50%. In this example, the time taken to reach 50% is 45 seconds.

The dimensional stability of the wash basin was tested by subjecting the wash basin to a conventional test similar to that to which the shower tray was subjected. The wash basin was subjected to 1,000 cycles of alternately filling and emptying the wash basin with hot water at 100° C. and cold water at room temperature. During and after the test, the wash basin was found to be totally dimensionally stable. The wash basin was then subjected to a further test to test the dimensional stability of the wash basin by subjecting the wash basin to a temperature of 160° C. for a continuous period of one hour. The wash basin proved to be fully dimensionally stable.

While the apparatus has been described as comprising a vacuum mould, in certain cases, it is envisaged that apparatus with other moulds may be provided. For example, it is envisaged that in certain cases a pressure type mould would be used where the PET sheet would be formed onto the forming surface of the mould by positive pressure rather than vacuum. Such moulding apparatus will be well known to those skilled in the art. Needless to say, other means for heating the mould besides heated oil may be used, for example, electrically powered cartridge heaters or the like may be used.

It will also be appreciated that other suitable heat sources besides radiant heaters may be used, and indeed, in certain cases, it is envisaged that the second radiant heater may be dispensed with and the first surface of the PET sheet would be raised to the preforming temperature by heat transfer from the mould.

It will of course be appreciated by those skilled in the art that the method of the invention and apparatus according to the invention may be used for other variations of PET material. In which case, the temperatures to which the PET material would be subjected may vary depending on the glass/rubber transition temperature and melt temperature of the PET sheet. Examples of variations of PET sheet material which may be thermo-formed using the method and apparatus according to the invention are as follows:

(a) any crystallisable homopolymers of PET, (b) any crystallisable co-polymers of PET, (c) any crystallisable compounds of PET, (d) other variations of PET material.

I claim:

1. A method for forming an article from a sheet of amorphous PET material of thickness greater than 1.5 mm having a pair of opposite first and second surfaces, the method comprising the steps of:

heating the PET sheet to raise the temperature of the first and second surfaces of the PET sheet to a preforming temperature in the range between the glass/rubber transition temperature and the melt temperature of the PET sheet, forming the heated PET sheet onto a heated mould with the first surface of the PET sheet in contact with the mould, retaining the formed PET sheet in contact with the mould, raising the temperature of the first and second surfaces of the formed PET sheet in the mould to a crystallising temperature in the range between the glass/rubber transition temperature and the melt temperature of the PET sheet, the crystallising temperature being higher than the preforming temperature, and the crystallising temperature of the first and second surfaces being substantially similar, and being within ±5° C. of each other, maintaining the temperature of the first and second surfaces of the formed PET sheet at the crystallising temperature while the formed PET sheet is retained in the mould until the degree of crystallisation of the formed PET sheet reaches at least 25%, the temperature of the first surface of the formed PET sheet being raised from the preforming temperature to the crystallising temperature and being maintained at the crystallising temperature by heat transfer from the mould, and the temperature of the second surface being raised from the preforming temperature to the crystallising temperature and being maintained at the crystallising temperature by heat transfer from a first heat source provided by a radiant heat source spaced apart from and directed at the second surface of the formed PET sheet, and releasing the formed PET sheet from the mould on the degree of crystallisation of the PET sheet reaching at least 25%.

2. A method as claimed in claim 1 in which the first heat source is provided adjacent the second surface of the PET sheet while the formed PET sheet is retained in the mould.

3. A method as claimed in claim 1 in which the crystallising temperature at which the first and second surfaces of the PET sheet are maintained while the formed PET sheet is retained in the mould is in the range of 80° C. to 250° C.

4. A method as claimed in claim 3 in which the crystallising temperature is in the range of 120° C. to 210° C.

5. A method as claimed in claim 4 in which the crystallising temperature is in the range of 140° C. to 180° C.

6. A method as claimed in claim 1 in which the formed PET sheet is released from the mould on the degree of crystallisation of the formed PET sheet being in the range of 25% to 50%.

7. A method as claimed in claim 6 in which the formed PET sheet is released from the mould on the degree of crystallisation of the formed sheet being greater than 35%.

8. A method as claimed in claim 1 in which the formed PET sheet is retained in the mould for a period of time in the range of thirty seconds to five minutes.

9. A method as claimed in claim 1 in which the preforming temperature in the range of 80° C. to 140° C.

10. A method as claimed in claim 1 in which the PET sheet is of thickness in the range of 1.5 mm to 10 mm.

11. A method as claimed in claim 1 in which the PET sheet has an intrinsic viscosity in the range of 0.5 to 1.2.

* * * * *